United States Patent
Singh et al.

(10) Patent No.: US 12,223,054 B2
(45) Date of Patent: Feb. 11, 2025

(54) DENIAL OF DYNAMIC HOST CONFIGURATION PROTOCOL INTERNET PROTOCOL ADDRESS ALLOCATION TO AN UNAUTHORIZED NODE VIA CROSS SECURE BOOT VERIFICATION

(71) Applicant: Dell Products L.P., Round Rock, TX (US)

(72) Inventors: Ankit Singh, Bangalore (IN); Deepaganesh Paulraj, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 182 days.

(21) Appl. No.: 18/157,701

(22) Filed: Jan. 20, 2023

(65) Prior Publication Data
US 2024/0248994 A1   Jul. 25, 2024

(51) Int. Cl.
G06F 21/57    (2013.01)
G06F 21/33    (2013.01)
H04L 9/40     (2022.01)

(52) U.S. Cl.
CPC ............ *G06F 21/575* (2013.01); *G06F 21/33* (2013.01); *H04L 63/061* (2013.01)

(58) Field of Classification Search
CPC ..... G06F 21/33; G06F 21/575; H04L 63/0823
See application file for complete search history.

(56) References Cited

U.S. PATENT DOCUMENTS

| | | | | |
|---|---|---|---|---|
| 9,582,308 | B2 * | 2/2017 | Masurekar | G06F 9/45558 |
| 11,010,478 | B2 * | 5/2021 | Paulraj | G06F 21/575 |
| 11,086,998 | B2 * | 8/2021 | Martinez | G06F 21/44 |
| 11,349,806 | B2 * | 5/2022 | Atanasov | H04L 41/0856 |
| 2020/0250293 | A1 * | 8/2020 | Paulraj | G06F 9/441 |
| 2021/0377299 | A1 * | 12/2021 | Kaliyamoorthy | H04L 63/1416 |

OTHER PUBLICATIONS

"DHCP client/server interaction" [https://www.ibm.com/docs/en/i/7.4?topic=concepts-dhcp-clientserver-interaction] retrieved Dec. 20, 2022, 3 pages.

(Continued)

*Primary Examiner* — Brian T Misiura
(74) *Attorney, Agent, or Firm* — Amin, Turocy & Watson, LLP

(57) ABSTRACT

Denial of dynamic host configuration protocol (DHCP) internet protocol (IP) address allocation to an unauthorized node via cross secure boot verification is presented herein. A system enables storage of a boot storage certificate in a boot data store of a client device, in which the boot storage certificate has been signed by a key exchange key (KEK) that has been stored in a network boot data store of a network switch device of a network; intercepts a DHCP discover packet that has been directed, by the client device, to a DHCP device of the system that assigns respective IP addresses to client devices to facilitate respective accesses, via the client devices using the respective IP addresses, of the network; and in response to determining that the secure boot storage certificate has been signed by the KEK, assigns an IP address of the respective IP addresses to the client device.

20 Claims, 13 Drawing Sheets

(56) References Cited

OTHER PUBLICATIONS

"Welcome to the DHCP Server for Windows" [https://www.dhcpserver.de/cms/] retrieved Dec. 21, 2022, 2 pages.
"Dynamic Host Configuration Protocol(DHCP)" Jul. 29, 2021 [https://learn.microsoft.com/en-us/windows-server/networking/technologies/dhcp/dhcp-top] retrieved Nov. 29, 2022, 3 pages.
"Key exchange" Wikipedia. [https://en.wikipedia.org/wiki/Key_exchange] retrieved Dec. 20, 2022, 2 pages.
"MAC address" Wikipedia. [https://en.wikipedia.org/wiki/MAC_address] retrieved Dec. 21, 2022, 10 pages.
"MAC spoofing" Wikipedia. [https://en.wikipedia.org/wiki/MAC_spoofing] retrieved Dec. 18, 2022, 4 pages.
Prakash, Suraj. "NAC-hacking—Bypassing network access control" Infosec. Jun. 15, 2017. [https://resources.infosecinstitute.com/topic/nac-hacking-bypassing-network-access-control/#gref] retrieved Dec. 18, 2022, 5 pages.
Prakash, Suraj. "NAC-hacking—Bypassing network access control" Infosec. Jun. 16, 2017 [https://www.infosecinstitute.com/resources/penetration-testing/nac-hacking-bypassing-network-access-control/] retrieved Dec. 18, 2022, 8 pages.
"Network switch" Wikipedia. [https://en.wikipedia.org/wiki/Network_switch] retrieved Dec. 21, 2022, 7 pages.
"The Meaning of all the UEFI Keys" James Bottomley's random Pages. [https://blog.hansenpartnership.com/the-meaning-of-all-the-uefi-keys/] retrieved Dec. 20, 2022, 9 pages.
"Unified Extensible Firmware Interface/SecureBoot" ArchLinux Wikipedia. [https://wiki.archlinux.org/title/Unified_Extensible_Firmware_Interface/Secure_Boot] retrieved Dec. 20, 2022, 24 pages.

\* cited by examiner

900

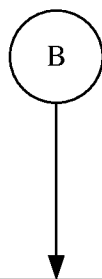

910 forward, by the system, the DHCP offer packet to the client device to facilitate assigning the IP address to the client device

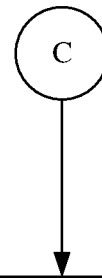

920 prevent, by the system, the DHCP offer packet from being forwarded to the client device to prevent an access of the network by the client device

930 send, by the system via the network switch, an IP release notification to the DHCP device to prevent the access of the network by the device

FIG. 9

DENIAL OF DYNAMIC HOST CONFIGURATION PROTOCOL INTERNET PROTOCOL ADDRESS ALLOCATION TO AN UNAUTHORIZED NODE VIA CROSS SECURE BOOT VERIFICATION

TECHNICAL FIELD

The subject disclosure generally relates to embodiments for denial of dynamic host configuration protocol (DHCP) internet protocol (IP) address allocation to an unauthorized node via cross secure boot verification.

BACKGROUND

Servers, systems, and other computing devices are compromised daily by malware. Although conventional malware technologies aim to detect and correct for malware that has been established in a network, such technologies fail to prevent the malware from being introduced into the network. Further, a hacker, or unauthorized user, can perform IP or media access control (MAC) spoofing, e.g., changing a MAC address that has been assigned to a computer to modify the computer's identity—enabling the hackers to hide the computer on a network, allowing the hackers to mimic another network device, and/or allowing the hacker to bypass blacklisting of a MAC address to gain un-authorized access to a network.

Consequently, conventional malware technologies have had some drawbacks, some of which may be noted with reference to the various embodiments described herein below.

BRIEF DESCRIPTION OF THE DRAWINGS

Non-limiting embodiments of the subject disclosure are described with reference to the following Figures, in which like reference numerals refer to like parts throughout the various views unless otherwise specified:

FIGS. 7-9 illustrate flow charts of a method that denies DHCP IP address allocation to an unauthorized node via cross secure boot verification, in accordance with various example embodiments;

DETAILED DESCRIPTION

Figure 1:
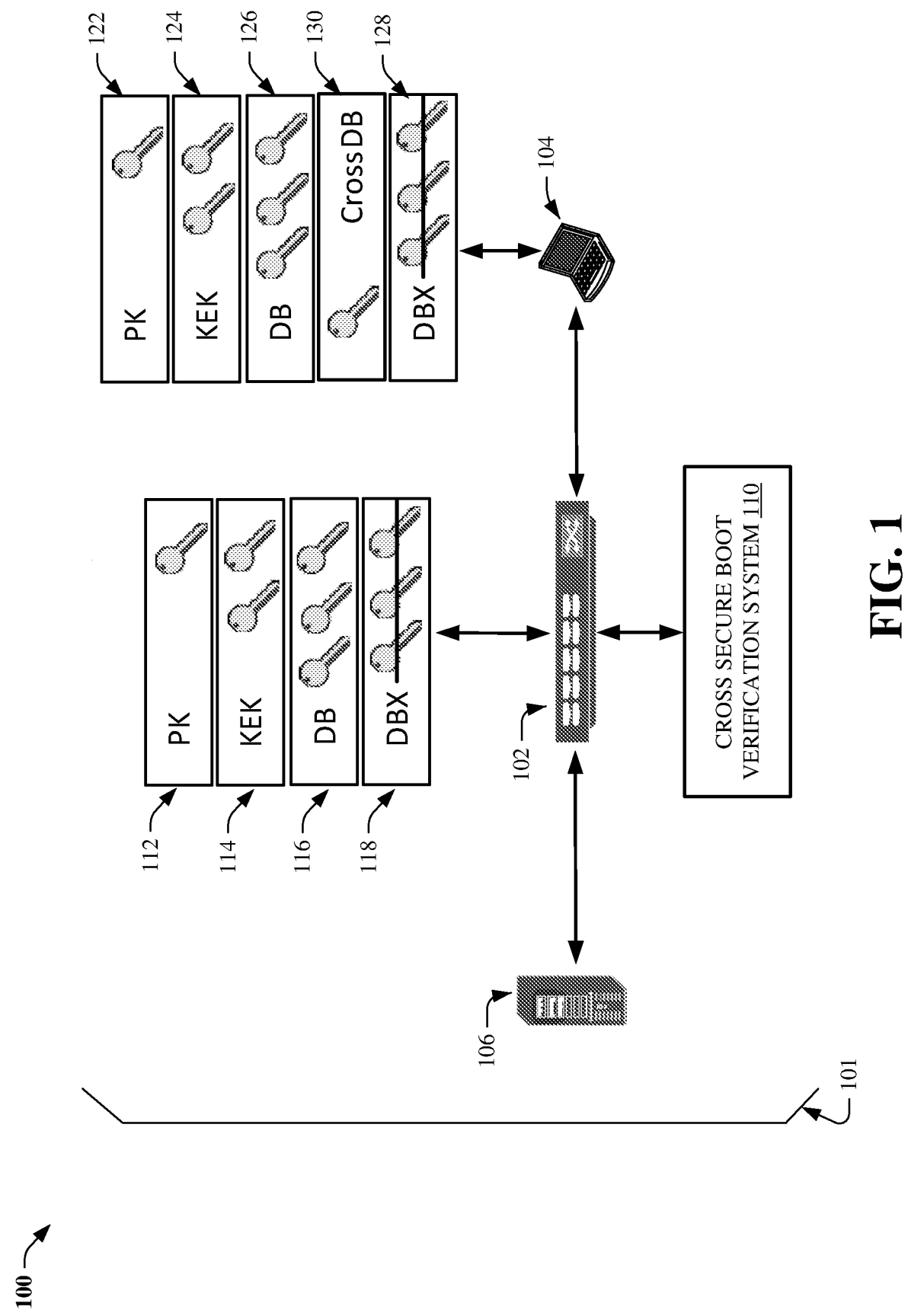
FIG. 1 illustrates a block diagram of a network computing environment including a cross secure boot verification system communicatively coupled to a network switch to deny DHCP IP address allocation to an unauthorized node via cross secure boot verification, in accordance with various example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

Conventional malware technologies have had some drawbacks with respect to preventing malware from being introduced into a network, preventing mimicking of network device(s) by unauthorized users, and/or permitting un-authorized access to the network. Various embodiments disclosed herein can deny DHCP IP address allocation to an unauthorized node by authenticating nodes using secure boot certificates that have been stored in authenticated variable storage, e.g., boot storage.

For example, in an embodiment, a system (e.g., a cross secure boot verification system) can comprise a processor and a memory that stores executable components that, when executed by the processor, facilitate performance of operations by the system, the operations comprising: enabling storage of a secure boot storage certificate in a secure boot data store of a client device, in which the secure boot storage certificate has been signed by a key exchange key (KEK) that has been stored in a network boot data store of a network switch device of a network; intercepting a DHCP discover packet that has been sent from the client device and that has been directed to a DHCP device, e.g., server, of the system, in which the DHCP server assigns respective IP addresses to client devices to facilitate respective accesses, via the client devices using the respective IP addresses, of the network; and in response to determining that the secure boot storage certificate, which has been stored in the secure boot data store of the client device, has been signed by the KEK that has been stored in the network boot data store, assigning an IP address of the respective IP addresses to the client device.

In one embodiment, the enabling of the storage of the secure boot storage certificate comprises: based on a defined network access policy, determining whether the client device has been authorized to access the network; and in response to the client device being determined to have been authorized to access the network, generating the secure boot storage certificate, and sending the secure boot storage certificate to the client device to facilitate the storage of the secure boot storage certificate in the secure boot data store of the client device.

In another embodiment, the generating of the secure boot storage certificate comprises: signing the secure boot storage certificate with the KEK that has been stored in the network boot data store.

In yet another embodiment, the secure boot data store of the client device and the network boot data store of the network switch device correspond to respective unified extensible firmware interface (UEFI) based boot services.

In an embodiment, the sending of the secure boot storage certificate to the client device comprises: sending the secure boot storage certificate to the client device to facilitate the storage of the secure boot storage certificate in the secure boot data store of the client device utilizing a basic input output system (BIOS) based boot storage space modification procedure.

In one embodiment, the intercepting of the DHCP discover packet comprises: in response to the detecting, via the network switch device, that the DHCP discover packet has been received from the client device, extracting, from the DHCP discover packet, a MAC address representing a distinct representation of the client device, and based on the MAC address, sending, to the client device, a request for the client device to send, to the system, the secure boot storage certificate that has been stored in the secure boot data store of the client device.

In another embodiment, the detecting that the DHCP discover packet has been received comprises: preventing, via the network switch device, a DHCP offer packet that has been transmitted from the DHCP host from being forwarded to the client device pending a determination of whether the secure boot storage certificate that has been stored in the secure boot data store of the client device has been signed by the KEK that has been stored in the network boot data store.

In yet another embodiment, the determination of whether the secure boot storage certificate been signed by the KEK comprises: in response to the secure boot storage certificate being determined to have been signed by the KEK that has been stored in the network boot data store, forwarding the DHCP offer packet to the client device to facilitate the assigning of the IP address to the client device; and in response to the secure boot storage certificate being determined to have not been signed by the KEK that has been stored in the network boot data store, preventing the DHCP offer packet from being forwarded to the client device to prevent an access of the respective accesses of the network by the client device.

In an embodiment, a method comprises: facilitating, by a system (e.g., a cross secure boot verification system) comprising a processor, storage of an authentication key in a device boot storage space of a device, in which the authentication key has been signed by a KEK that has been stored in a switch boot storage space of a network switch of a network; in response to a DHCP discover packet being determined, via the network switch, to have been received from the device, determining, by the system, whether the device boot storage space comprises the authentication key that has been signed by the KEK that has been stored in the switch boot storage space; and in response to the device boot storage space being determined to comprise the authentication key that has been signed by the KEK that has been stored in the switch boot storage space, facilitating, by the system, an assignment of an IP address to the device to facilitate an access of the network by the device.

In one embodiment, the facilitating of the storage of the authentication key comprises: generating the authentication key comprising signing the authentication key with the KEK that has been stored in the switch boot storage space; and in response to the device being determined to be authorized to access the network, sending the authentication key to the device to facilitate storage of the authentication key in the device boot storage space.

In another embodiment, the method further comprises: in response to the DHCP discover packet being determined, via the network switch, to have been received from the device, blocking, by the system via the network switch, a DHCP offer packet that has been transmitted from a DHCP server of the system from being sent to the device awaiting the device being determined to be authorized to access the network.

In yet another embodiment, the determining whether the device boot storage space comprises the authentication key comprises: extracting, from the DHCP discover packet, a MAC address representing the device; and based on the MAC address, sending, to the device, a request for the device to send the authentication key to the system.

In this regard, in an embodiment, the method further comprises: in response to the authentication key being determined to have not been received from the device, sending, by the system via the network switch, an IP release notification to the DHCP server to prevent the access of the network by the device; and in response to the authentication key being determined to have been received from the device, determining, by the system, whether the authentication key has been signed by the KEK that has been stored in the switch boot storage space.

In turn, in an embodiment, the method further comprises: in response to the authentication key being determined to have been signed by the KEK that has been stored in the switch boot storage space, unblocking the DHCP offer packet that has been transmitted from the DHCP device to facilitate the assignment of the internet protocol address to the device; and in response to the authentication key being determined to have not been signed by the KEK that has been stored in the switch boot storage space, sending, by the system via the network switch, an IP release notification to the DHCP device to prevent the access of the network by the device.

In another embodiment, a non-transitory machine-readable medium comprises instructions that, in response to execution, cause a system comprising a processor to perform operations, the operations comprising: enabling a boot storage network access key to be stored in a memory partition of a device boot memory space of a client device, in which the boot storage network access key has been signed by a KEK that has been stored in a network switch boot memory space of a network switch of a network; in response to determining that a DHCP discover packet has been received, via the network switch, from the client device, blocking a DHCP offer packet that has been transmitted from a DHCP device of the system from being forwarded to the client device pending the client device being determined to be authorized to access the network; and in response to determining that the boot storage network access key, which has been stored in the memory partition in the device boot memory space, has been signed by the KEK that has been stored in the network switch boot memory space, authorizing the client device to access the network by unblocking the DHCP offer packet, in which the unblocking comprises forwarding the DHCP offer packet to the client device.

In yet another embodiment, the enabling of the boot storage network access key to be stored in the memory partition of the device boot memory space comprises: in response to determining that the client device has been authorized to access the network, sending the boot storage network access key to the client device to facilitate the storage of the boot storage network access key in the memory partition of the device boot memory space.

In an embodiment, the determining that the DHCP discover packet has been received from the client device comprises: extracting, from the DHCP discover packet, a MAC address representing the device; and based on the MAC address, sending, to the device, a request for the device to send the boot storage network access key to the system.

Conventional systems are compromised daily by malware. Although multiple techniques can be used to detect an unauthorized or compromised node within a network, such techniques do not prevent an unauthorized node from getting introduced into, and/or from joining, the network, e.g., before the network can be compromised.

Further, although firewall mechanisms, e.g., utilizing an access control list, can determine, via MAC or IP fields based on security rules, what packets to allow/block in a network, such mechanisms can be spoofed by hackers—allowing the hackers to mimic network device(s), and/or bypass blacklisting of a MAC address to gain unauthorized access to the network.

On the other hand, various embodiments disclosed herein can block access by an unauthorized user node (e.g., server, laptop, or other computing device) of a network by preventing a DHCP server from allocating an IP address to the unauthorized user node. In this regard, embodiment(s) disclosed herein utilize a secure boot storage certificate that has been stored in authenticated variable, e.g., boot, storage of a client device to authorize assignment, via a DHCP server, of an IP address to the client device.

Figure 2:
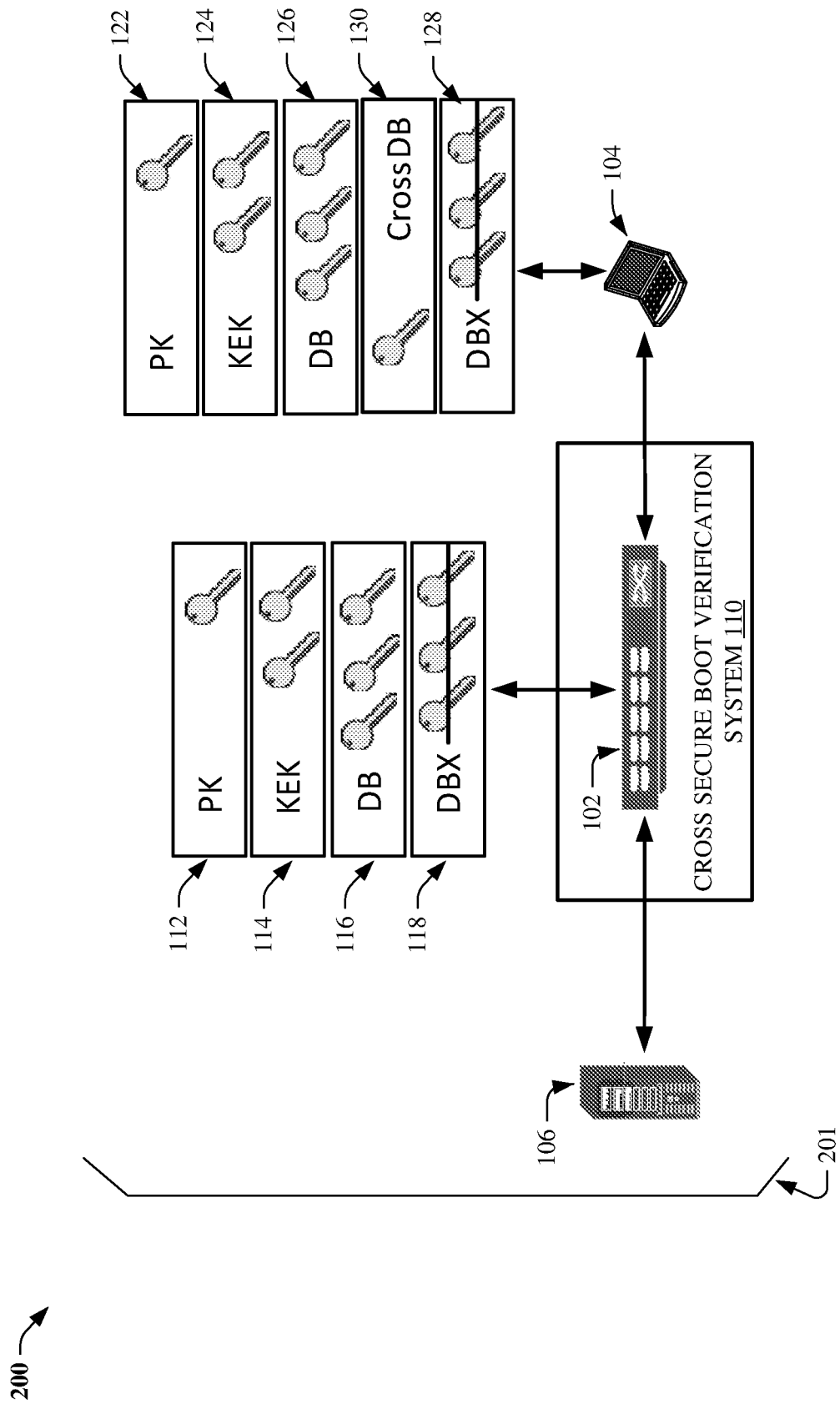
FIG. 2 illustrates a block diagram of a network computing environment including a cross secure boot verification system that includes a network switch—the cross secure boot verification system denying DHCP IP address allocation to an unauthorized node via cross secure boot verification, in accordance with various example embodiments.
Figure 3:
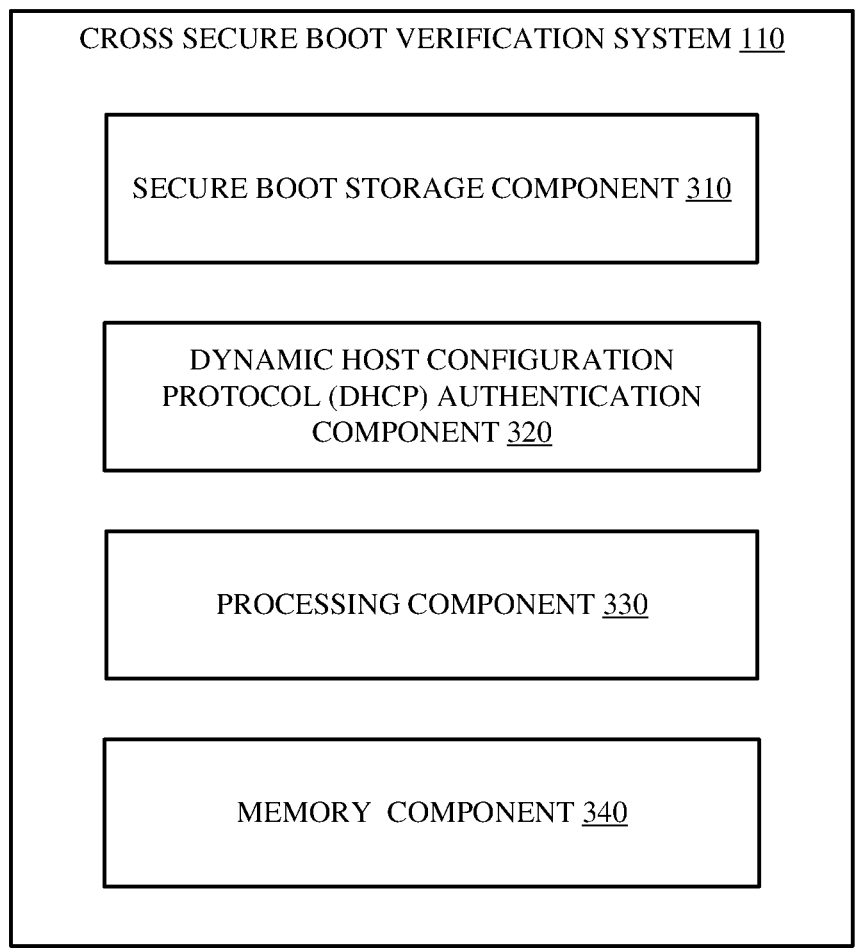
FIG. 3 illustrates a block diagram of a cross secure boot verification system that denies DHCP IP address allocation to an unauthorized node via cross secure boot verification, in accordance with various example embodiments.

Referring now to FIGS. 1-3, block diagrams (100-300) of a network (e.g., cloud) computing environment (101) including a cross secure boot verification system (110) communicatively coupled to a network switch (102) to deny DHCP IP address allocation to an unauthorized node via cross secure boot verification; another network (e.g., cloud) computing environment (201) including the cross secure boot verification system (110) that includes the network switch—the cross secure boot verification system denying DHCP IP address allocation to an unauthorized node via cross secure boot verification; and the cross secure boot verification system are illustrated, respectively, in accordance with various example embodiments.

As illustrated by FIGS. 1 and 2, an authenticated variable storage space (e.g., secure boot data store, device boot storage space, device boot memory space) of a device (e.g., client device, server, laptop, or other computing device device) (104) includes a platform key (PK) (122) that establishes a platform-firmware trust relationship between a platform owner of the corresponding network (e.g., cloud) computing environment (101, 201), and firmware (e.g., corresponding to an UEFI BIOS) of the device by controlling access to a KEK database corresponding to the network; a KEK (124) (e.g., the KEK database) that establishes a firmware-operating system (OS) trust relationship between the firmware and an OS of the device; a whitelist database (DB) (126) that includes a list of public keys that are used to check/verify a digital signature of the firmware/software of the device; and a blacklist database (DBX) (128) that includes a list of public keys that are known to correspond to malicious/unauthorized firmware/software. Further, a network boot data store (e.g., switch boot storage space, network switch boot memory space) of the network switch includes a PK (112), a KEK (114), a DB/whitelist database (116), and a DBX/blacklist database (118).

A new memory space (e.g., storage partition, namespace) (130) is introduced into the authenticated variable storage space of the device—the new memory space named "Cross Database" (or "Cross DB"), which includes a secure boot storage certificate (e.g., authentication key, boot storage network access key) that has been signed by the KEK (114) that has been stored in the network boot data store of the network switch. In an embodiment, the secure boot storage certificate that has been signed by the KEK has further been signed by the PK (112) of the network boot data store.

In embodiment(s), the authenticated variable storage space of the device and the network boot data store of the network switch correspond to respective UEFI-based boot services.

Figure 4:
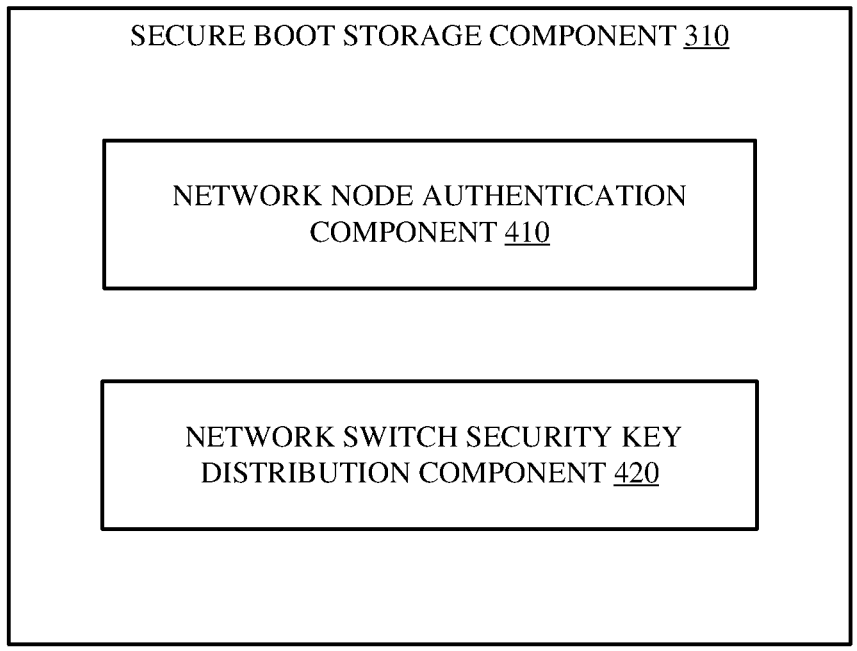
FIG. 4 illustrates a block diagram of a secure boot storage component, in accordance with various example embodiments.
Figure 5:
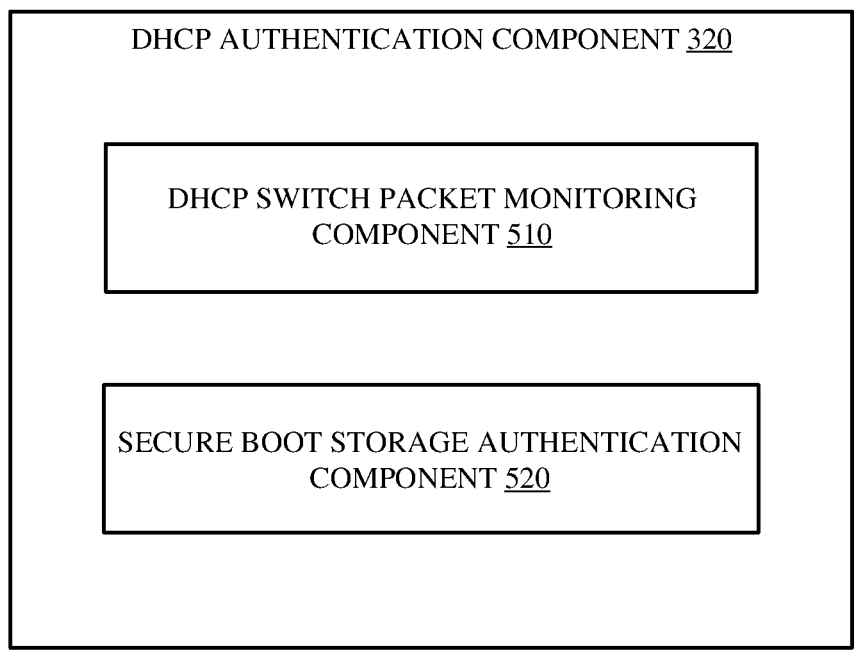
FIG. 5 illustrates a block diagram of DHCP authentication component, in accordance with various example embodiments.

Referring now to FIGS. 3-5, the cross secure boot verification system includes a secure boot storage component (310), a DHCP authentication component (320), a processing component (330), and a memory component (340). In embodiment(s), the memory component stores executable components that, when executed by the processing component, facilitate performance of operations by the cross secure boot verification system.

In other embodiment(s), the cross secure boot verification system enables storage of the secure boot storage certificate in the Cross DB (130) of the device (104). For example, in embodiment(s) illustrated by FIG. 4, the secure boot storage component includes a network node authentication component (410) and a network switch key distribution component (420).

The network node authentication component can determine, based on a defined network access policy (e.g., via an online authentication user interface or portal (not shown), whether the device has been authorized to access the network. Further, in response to the device being determined to have been authorized to access the network, the network node authentication component generates the secure boot storage certificate; and the network switch key distribution component sends the secure boot storage certificate to the device to facilitate the storage of the secure boot storage certificate in the Cross DB of the device.

In an embodiment, the network node authentication component generates the secure boot storage certificate by signing the secure boot storage certificate with the KEK (114) that has been stored in the network boot data store. In one embodiment, the network node authentication component further signs the secure boot storage certificate with the PK (112) that has been stored in the network boot data store.

In another embodiment, the network switch key distribution component sends the secure boot storage certificate to the device utilizing a BIOS-based boot storage space modification procedure of the device. In turn, a user identity of a user of the device can add, program, and/or install the secure boot storage certificate in the Cross DB via a custom, e.g., programming, mode provided by the BIOS of the device.

Figure 6:
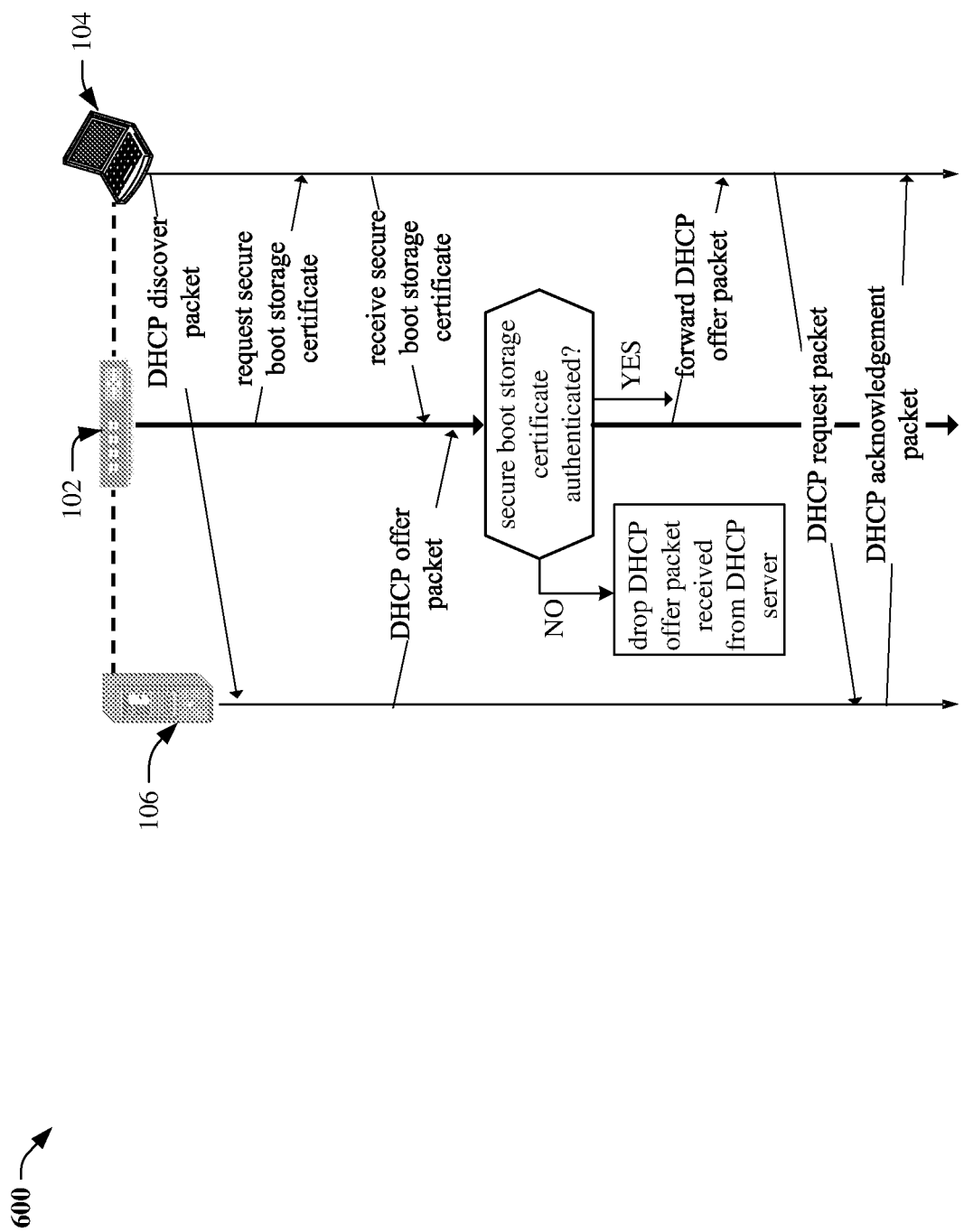
FIG. 6, illustrates a block diagram representing packet communication between a client device, network switch, and DHCP server, in accordance with various example embodiments.

Referring now to embodiment(s) illustrated by FIGS. 5 and 6, the DHCP authentication component (320) includes a DHCP switch packet monitoring component (510) and a secure boot storage authentication component (520). The DHCP switch packet monitoring component intercepts a DHCP discover packet that has been sent from the device and that has been directed to a DHCP device (106) (e.g., DHCP server, DHCP host)—the DHCP server assigns respective IP addresses to devices/client devices to facilitate respective accesses, via the devices/client devices using the respective IP addresses, of the network.

In an embodiment, the DHCP switch packet monitoring component, in response to detecting, via the network switch device, that the DHCP discover packet has been received from the device, prevents/blocks, via the network switch device, a DHCP offer packet that has been transmitted from the DHCP server from being forwarded to the device, pending a determination of whether the secure boot storage certificate that has been stored in the secure boot data store of the client device has been signed by the KEK that has been stored in the network boot data store, e.g., and that has further been signed by the PK that has been stored in the network boot data store.

In this regard, the DHCP switch packet monitoring component extracts, from the DHCP discover packet, a MAC address representing a distinct representation of the device. In turn, the secure boot storage authentication component sends, to the device using the MAC address, a request for the device to send, to the cross secure boot verification system, the secure boot storage certificate that has been stored in the secure boot data store of the client device.

In response to receiving, from the device based on the request, the secure boot storage certificate, the secure boot storage authentication component determines whether the secure boot storage certificate has been signed by the KEK that has been stored in the network boot data store.

In response to determining that the secure boot storage certificate has been signed by the KEK that has been stored in the network boot data store, the secure boot storage authentication component considers the device as a valid node, e.g., corresponding to an authorized user, and forwards the DHCP offer packet, which has been blocked from reaching the device, to the device to facilitate an assignment, by the DHCP server via DHCP protocol(s), of an IP address to the device, e.g., upon the DHCP server receiving a DHCP request packet from the device, and upon the DHCP server sending, based on the DHCP request packet, a DHCP acknowledgement (ACK) packet to the device.

On the other hand, in response to determining that the secure boot storage certificate has not been signed by the KEK that has been stored in the network boot data store, the secure boot storage authentication component considers the device as an unauthorized, or invalid node, and drops the DHCP offer packet that has been received from the DHCP server—denying the device access to the network by preventing the DHCP offer packet from reaching the device. In embodiment(s), the secure boot storage authentication component further sends, via the network switch, an IP release notification to the DHCP server to prevent a valid IP address from being assigned to the device.

FIGS. 7-12 illustrate methodologies that facilitate denial of DHCP IP address allocation to an unauthorized node via cross secure boot verification, in accordance with various example embodiments. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 7:
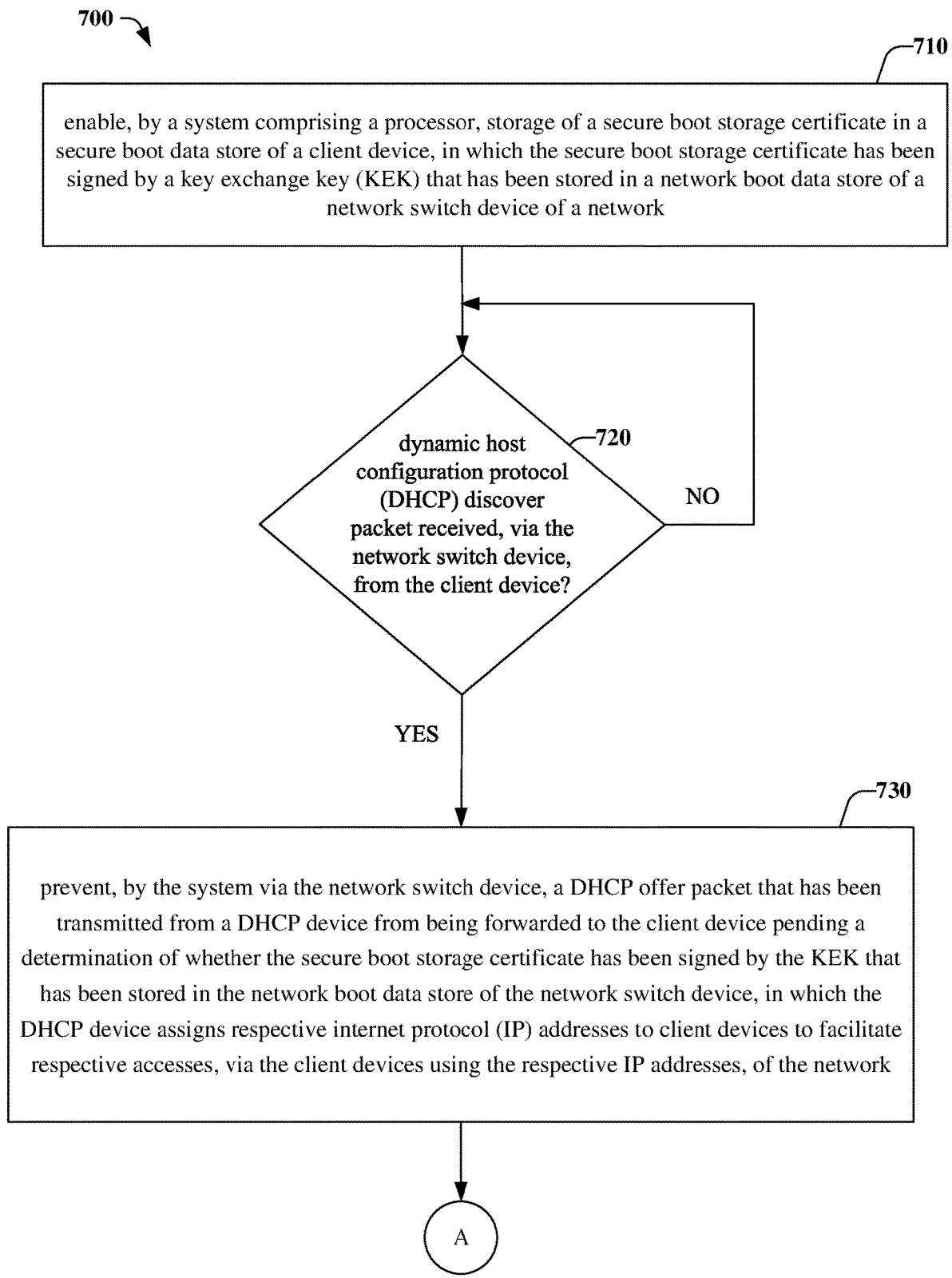
Figure 8:
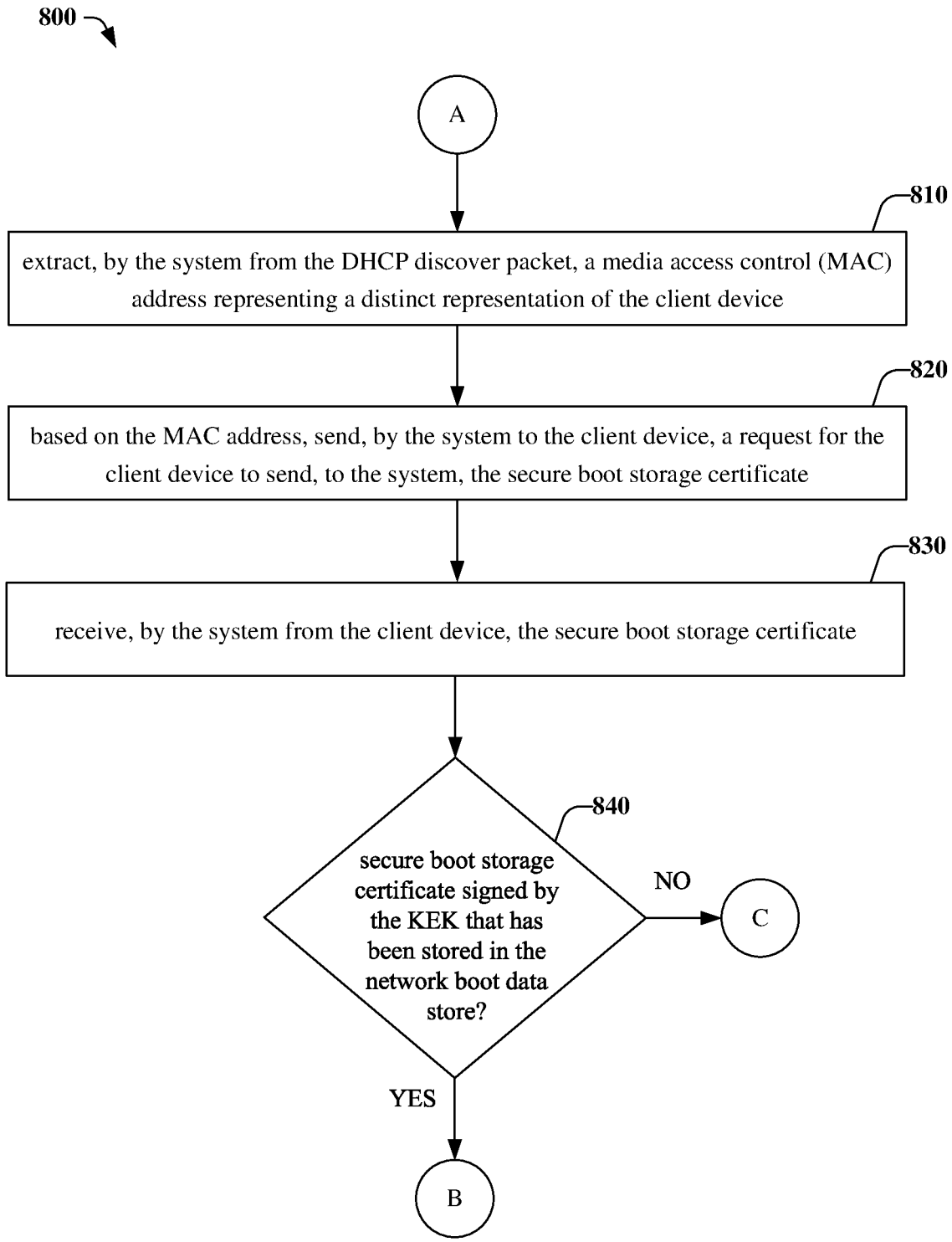

FIGS. 7-9 illustrate flow charts (700-900) of a method that denies DHCP IP address allocation to an unauthorized node via cross secure boot verification, in accordance with various example embodiments. At 710, a system (e.g., 110) comprising a processor (e.g., corresponding to processing component (330)) enables storage of a secure boot storage certificate in a secure boot data store of a client device, in which the secure boot storage certificate has been signed by a KEK that has been stored in a network boot data store of a network switch device of a network.

At 720, the system determines whether a DHCP discover packet has been received, via the network switch device, from the client device. In this regard, in response to the DHCP discover packet being determined to have been received, flow continues to 730, at which the system prevents, via the network switch device, a DHCP offer packet that has been transmitted from a DHCP device (e.g., server) from being forwarded to the client device pending a determination of whether the secure boot storage certificate has been signed by the KEK that has been stored in the network boot data store of the network switch device, in which the DHCP device assigns respective IP addresses to client devices to facilitate respective accesses, via the client devices using the respective IP addresses, of the network; otherwise flow returns to 720.

Flow continues from 730 to 810, at which the system extracts, from the DHCP discover packet, a MAC address representing a distinct representation of the client device. At 820, the system sends, based on the MAC address, a request to the client device for the client device to send, to the system, the secure boot storage certificate. At 830, the system receives the secure boot storage certificate from the client device. At 840, the system determines whether the secure boot storage certificate has been signed by the KEK that has been stored in the network boot data store.

In this regard, in response the secure boot storage certificate being determined to have been signed by the KEK that has been stored in the network boot data store, flow continues to 910, at which the system forwards the DHCP offer packet to the client device to facilitate assigning, via the DHCP server, of the IP address to the client device; otherwise flow continues to 920, at which the system prevents the DHCP offer packet from being forwarded to the client device to prevent an access of the network by the client device.

Flow continues from 920 to 930, at which the system sends, via the network switch an IP release notification to the DHCP device to prevent the access of the network by the device.

Figure 10:
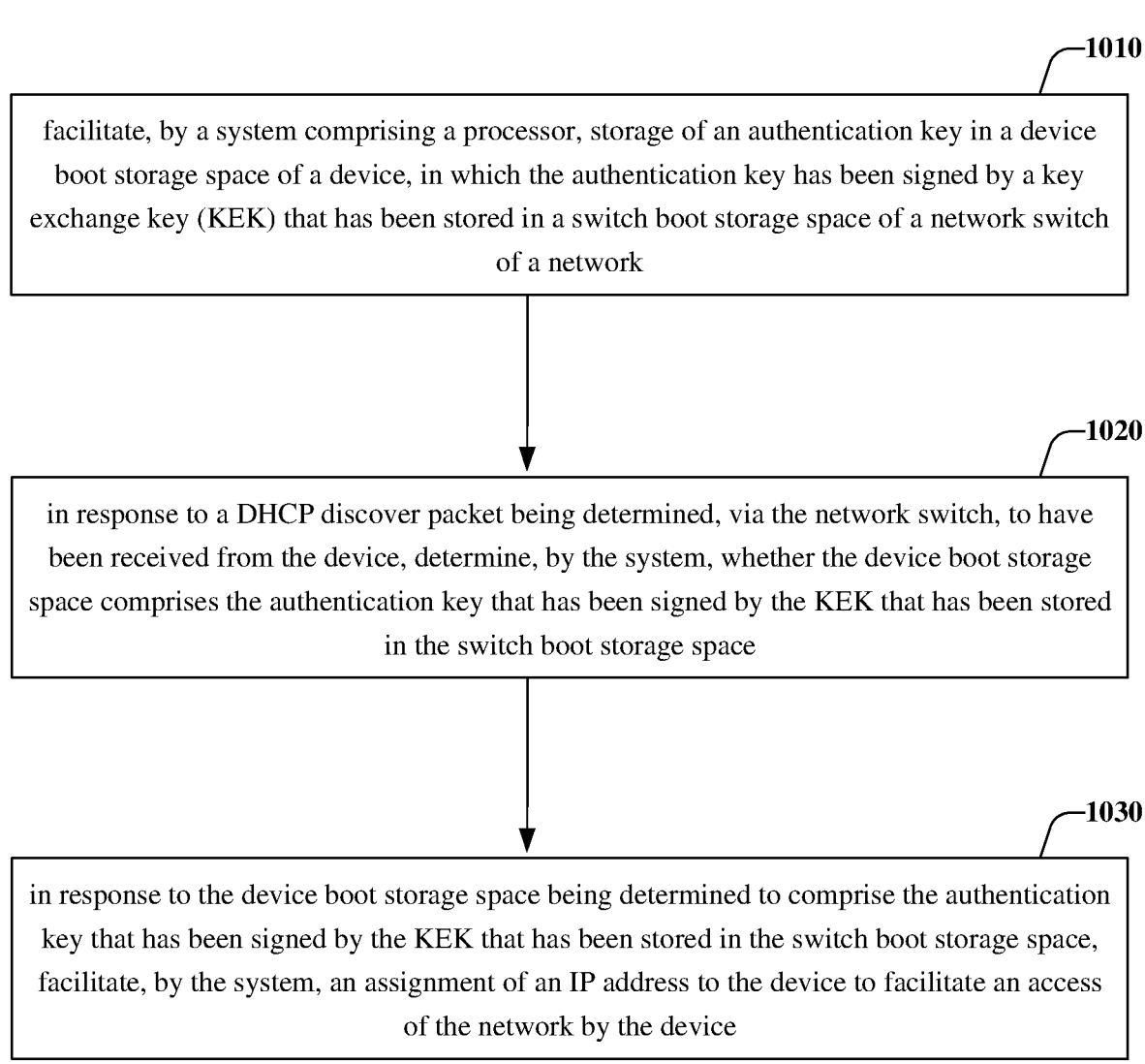
FIG. 10 illustrates a flow chart of a method that enables DHCP IP address allocation to an authorized node via cross secure boot verification, in accordance with various example embodiments.

FIG. 10 illustrates a flow chart (1000) of a method that enables DHCP IP address allocation to an authorized node via cross secure boot verification, in accordance with various example embodiments. At 1010, a system (e.g., 110) comprising a processor (e.g., corresponding to processing component (330)) facilitates storage of an authentication key in a device boot storage space of a device, in which the authentication key has been signed by a KEK that has been stored in a switch boot storage space of a network switch of a network.

Figure 11:
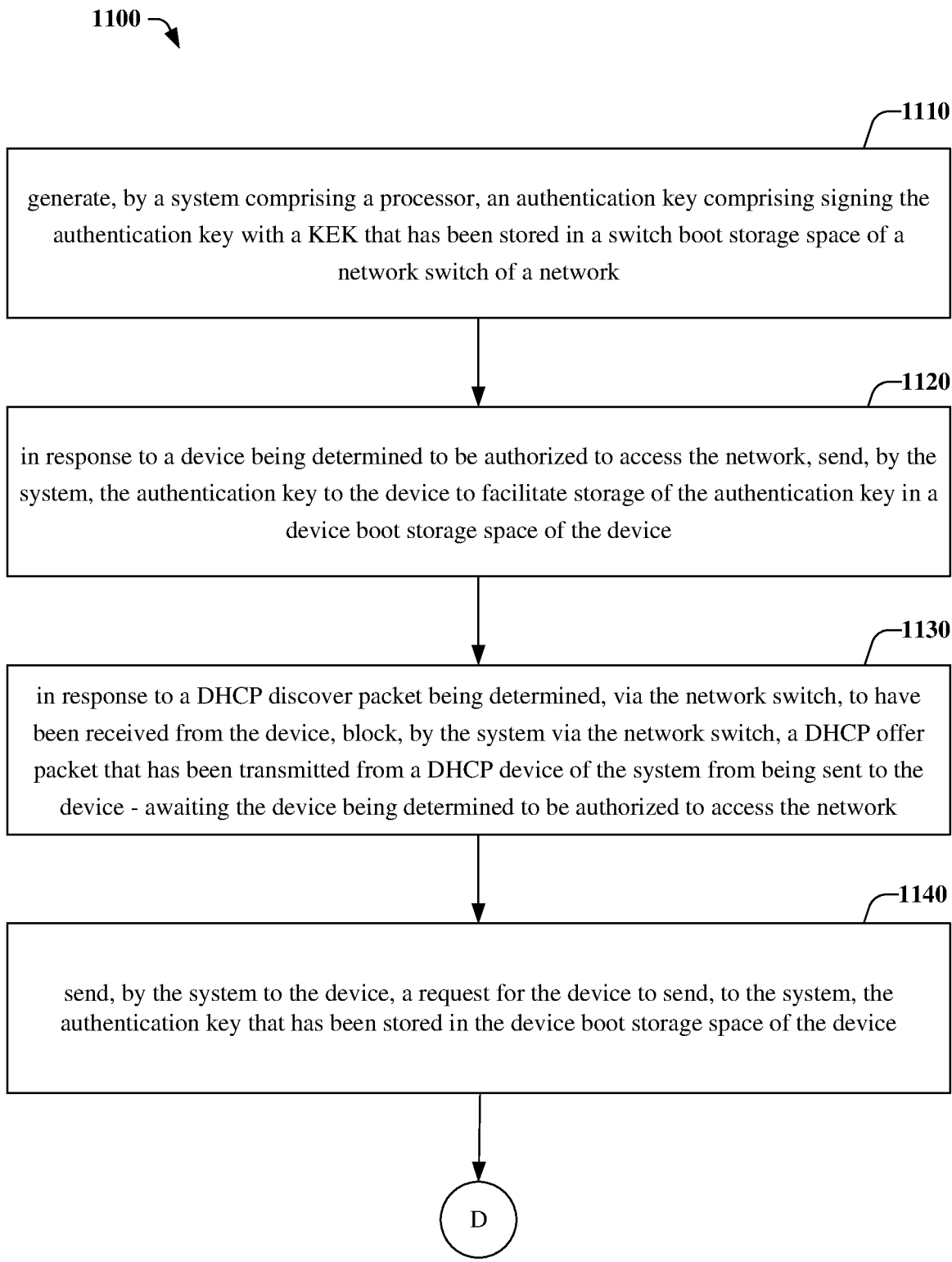
FIGS. 11-12 illustrate flow charts of another method that denies DHCP IP address allocation to an unauthorized node via cross secure boot verification, in accordance with various example embodiments.
Figure 12:
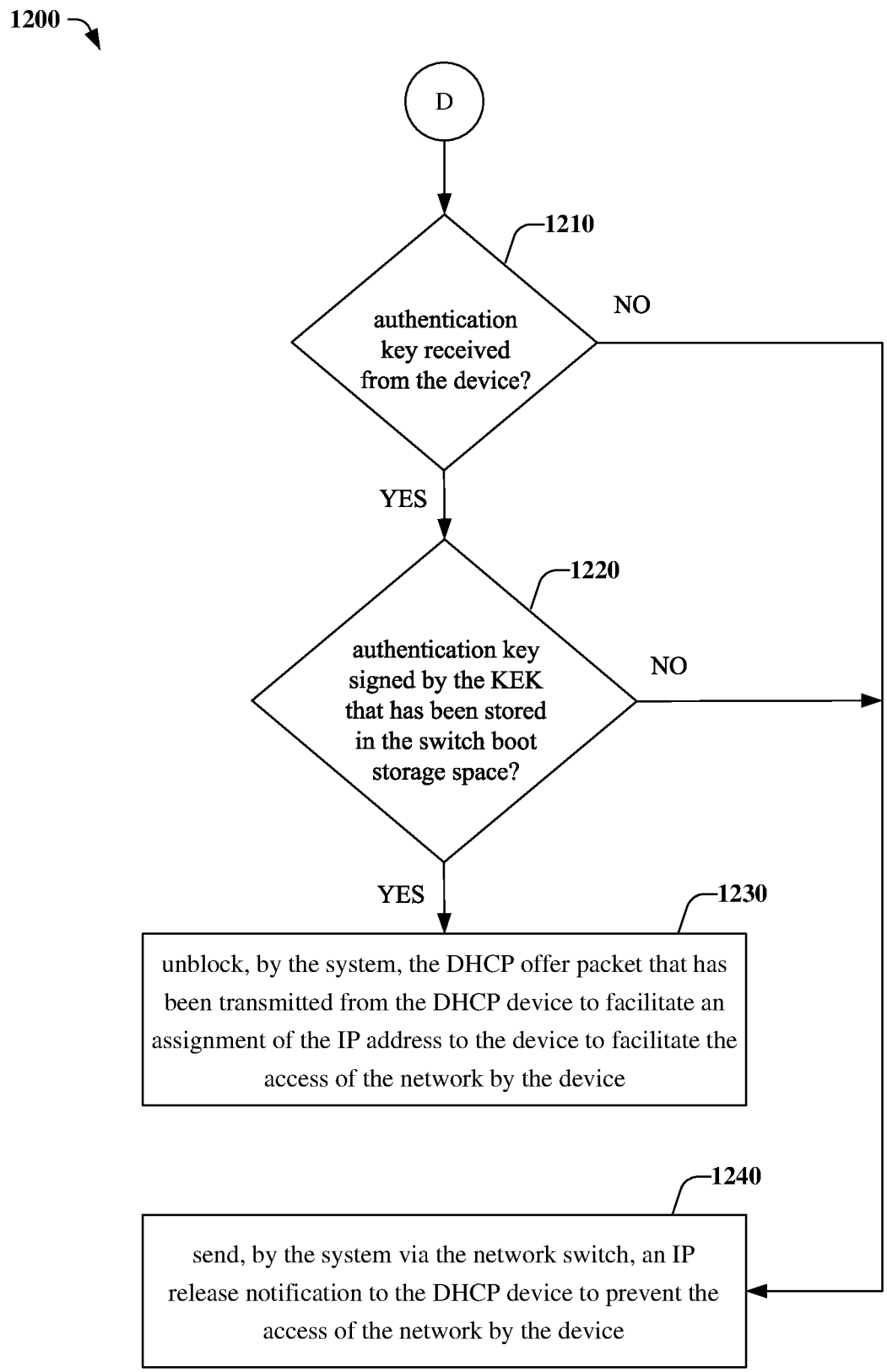

At 1020, in response to a DHCP discover packet being determined, via the network switch, to have been received from the device, the system determines whether the device boot storage space comprises the authentication key that has been signed by the KEK that has been stored in the switch boot storage space. At 1030, in response to the device boot storage space being determined to comprise the authentication key that has been signed by the KEK that has been stored in the switch boot storage space, facilitate, by the system, an assignment of an IP address to the device to facilitate an access of the network by the device FIGS. 11-12 illustrate flow charts (1100 and 1200) of another method that denies DHCP IP address allocation to an unauthorized node via cross secure boot verification, in accordance with various example embodiments. At 1110, a system (e.g., 110) comprising a processor (e.g., corresponding to processing component (330)) generates an authentication key comprising signing the authentication key with a KEK that has been stored in a switch boot storage space of a network switch of a network.

At 1120, in response to a device being determined to be authorized to access the network, the system sends the authentication key to the device to facilitate storage of the authentication key in a device boot storage space of the device.

At 1130, in response to a DHCP discover packet being determined, via the network switch, to have been received from the device, the system blocks, via the network switch, a DHCP offer packet that has been transmitted from a DHCP device of the system from being sent to the device— awaiting the device being determined to be authorized to access the network.

At 1140, the system sends, to the device, a request for the device to send, to the system, the authentication key that has been stored in the device boot storage space of the device. Flow continues from 1140 to 1210, at which the system determines whether the authentication key has been received from the device. In this regard, in response to a determination that the authentication key has been received from the device, flow continues to 1220, at which the system determines whether the authentication key has been signed by the KEK that has been stored in the switch boot storage space of the network switch; otherwise flow continues to 1240, at which the system sends, via the network switch, an IP release notification to the DHCP device to prevent the access of the network by the device.

At 1220, in response the authentication key being determined to have been signed by the KEK that has been stored in the switch boot storage space, flow continues to 1230, at which the system unblocks the DHCP offer packet that has been transmitted from the DHCP device to facilitate an access of the network by the device; otherwise flow continues to 1240.

Reference throughout this specification to "one embodiment," "an embodiment," "another embodiment", or "yet another embodiment" means that a particular feature, structure, or characteristic described in connection with the embodiment is included in at least one embodiment. Thus, the appearances of the phrase "in one embodiment," "in an embodiment," "in another embodiment", or "in yet another embodiment" in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, the terms "logic", "logical", "logically", and the like are intended to refer to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

As utilized herein, terms "component", "system", and the like are intended to refer to a computer-related entity, hardware, software (e.g., in execution), middleware, and/or firmware. For example, a component can be a processor, a process running on a processor, an object, an executable, a program, a storage device, and/or a computer. By way of illustration, an application running on a server, client, etc. and the server, client, etc. can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, a component can be an apparatus that provides specific functionality through electronic components without mechanical parts; the electronic components can comprise one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to: random access memory (RAM); read only memory (ROM); electrically erasable programmable read only memory (EEPROM); flash memory or other memory technology (e.g., card, stick, key drive, thumb drive, smart card); solid state drive (SSD) or other solid-state storage technology; optical disk storage (e.g., compact disk (CD) read only memory (CD ROM), digital video/versatile disk (DVD), Blu-ray disc); cloud-based (e.g., Internet based) storage; magnetic storage (e.g., magnetic cassettes, magnetic tape, magnetic disk storage or other magnetic storage devices); a virtual device that emulates a storage device and/or any of the above computer-readable media; or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

As it is employed in the subject specification, the term "processor", "processing component", etc. can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "storage", "data store", "storage space", "storage device", "storage medium", "memory component", and substantially any other information storage component relevant to operation and functionality of a system, component, and/or process, can refer to "memory components," or entities embodied in a "memory," or components comprising the memory. It will be appreciated that the memory components described herein can be either volatile memory or nonvolatile memory, or can comprise both volatile and nonvolatile memory.

By way of illustration, and not limitation, nonvolatile memory, for example, can be included in memory component (340), non-volatile memory 1322 (see below), disk storage 1324 (see below), and/or memory storage 1346 (see below). Further, nonvolatile memory can be included in read only memory (ROM), programmable ROM (PROM), electrically programmable ROM (EPROM), electrically erasable ROM (EEPROM), or flash memory. Volatile memory (e.g., 1320) can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 13:
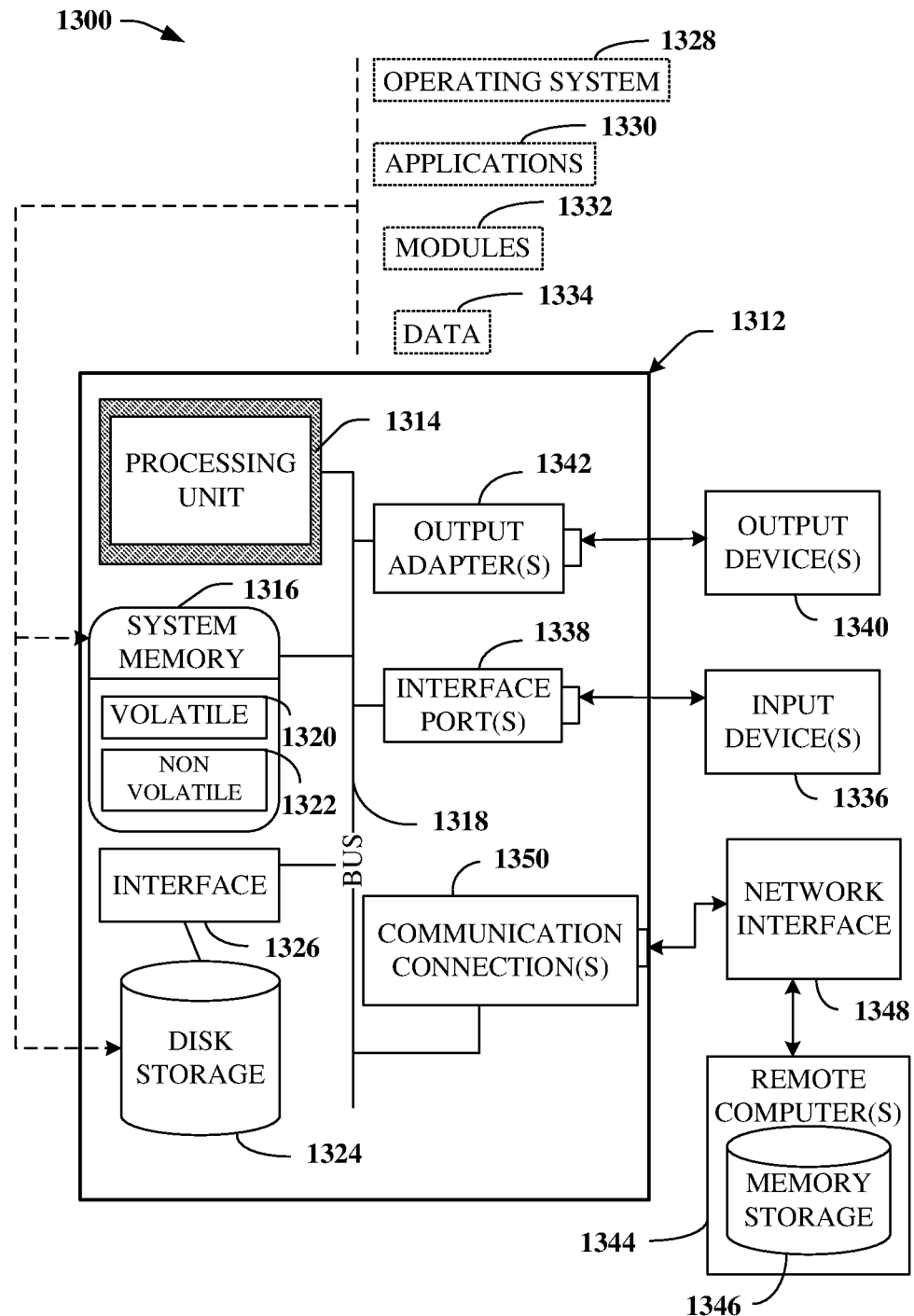
FIG. 13 illustrates a block diagram representing an illustrative non-limiting computing system or operating environment in which one or more aspects of various embodiments described herein can be implemented.

In order to provide a context for the various aspects of the disclosed subject matter, FIG. 13, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 13, a block diagram of a computing system 1300 operable to execute the disclosed systems and methods, e.g., via a network (e.g., cloud) computing environment (101, 201) is illustrated, in accordance with an embodiment. Computer 1312 comprises a processing unit 1314, a system memory 1316, and a system bus 1318. System bus 1318 couples system components comprising, but not limited to, system memory 1316 to processing unit 1314. Processing unit 1314 can be any of various available processors. Dual microprocessors and other multiprocessor architectures also can be employed as processing unit 1314.

System bus 1318 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1316 comprises volatile memory 1320 and nonvolatile memory 1322. A basic input/output system (BIOS), containing routines to transfer information between elements within computer 1312, such as during start-up, can be stored in nonvolatile memory 1322. By way of illustration, and not limitation, nonvolatile memory 1322 can comprise ROM, PROM, EPROM, EEPROM, or flash memory. Volatile memory 1320 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1312 also comprises removable/non-removable, volatile/non-volatile computer storage media. FIG. 13 illustrates, for example, disk storage 1324. Disk storage 1324 comprises, but is not limited to, devices like a magnetic disk drive, floppy disk drive, tape drive, Jaz drive, Zip drive, LS-100 drive, flash memory card, or memory stick. In addition, disk storage 1324 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to system bus 1318, a removable or non-removable interface is typically used, such as interface 1326.

It is to be appreciated that FIG. 13 describes software that acts as an intermediary between users and computer resources described in suitable operating environment 1300. Such software comprises an operating system 1328. Operating system 1328, which can be stored on disk storage 1324, acts to control and allocate resources of computer system 1312. System applications 1330 take advantage of the management of resources by operating system 1328 through program modules 1332 and program data 1334 stored either in system memory 1316 or on disk storage 1324. It is to be appreciated that the disclosed subject matter can be implemented with various operating systems or combinations of operating systems.

A user can enter commands or information into computer 1312 through input device(s) 1336. Input devices 1336 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1314 through system bus 1318 via interface port(s) 1338. Interface port(s) 1338 comprise, for example, a serial port, a parallel port, a game port, a universal serial bus (USB), a wireless based port, e.g., Wi-Fi, Bluetooth, etc. Output device(s) 1340 use some of the same type of ports as input device(s) 1336.

Thus, for example, a USB port can be used to provide input to computer 1312 and to output information from computer 1312 to an output device 1340. Output adapter 1342 is provided to illustrate that there are some output devices 1340, like display devices, light projection devices, monitors, speakers, and printers, among other output devices 1340, which use special adapters. Output adapters 1342 comprise, by way of illustration and not limitation, video and sound devices, cards, etc. that provide means of connection between output device 1340 and system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. Remote computer(s) 1344 can be a personal computer, a server, a router, a network PC, a workstation, a microprocessor based appliance, a peer device, or other common network node and the like, and typically comprises many or all of the elements described relative to computer 1312.

For purposes of brevity, only a memory storage device 1346 is illustrated with remote computer(s) 1344. Remote computer(s) 1344 is logically connected to computer 1312 through a network interface 1348 and then physically and/or wirelessly connected via communication connection 1350. Network interface 1348 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1350 refer(s) to hardware/software employed to connect network interface 1348 to bus 1318. While communication connection 1350 is shown for illustrative clarity inside computer 1312, it can also be external to computer 1312. The hardware/software for connection to network interface 1348 can comprise, for example, internal and external technologies such as modems, comprising regular telephone grade modems, cable modems and DSL modems, wireless modems, ISDN adapters, and Ethernet cards.

The computer 1312 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1312 can connect to other devices/networks by way of antenna, port, network interface adaptor, wireless access point, modem, and/or the like.

The computer 1312 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   a processor; and
   a memory that stores executable components that, when executed by the processor, facilitate performance of operations by the system, the operations comprising:
   in response to a client device being determined to have been authorized to access a network,
      generating a secure boot storage certificate, and
      sending the secure boot storage certificate to the client device to facilitate storage of the secure boot storage certificate in a secure boot data store of the client device, wherein the secure boot storage certificate has been signed by a key exchange key that has been stored in a network boot data store of a network switch device of the network;
   intercepting a dynamic host configuration protocol discover packet that has been sent from the client device and that has been directed to a dynamic host configuration protocol device of the system, wherein the dynamic host configuration protocol device assigns respective internet protocol addresses to client devices to facilitate respective accesses, via the client devices using the respective internet protocol addresses, of the network; and
   in response to determining that the secure boot storage certificate, which has been stored in the secure boot data store of the client device, has been signed by the key exchange key that has been stored in the network boot data store, assigning an internet protocol address of the respective internet protocol addresses to the client device.

2. The system of claim 1, wherein the generating of the secure boot storage certificate comprises:
   based on a defined network access policy, determining whether the client device has been authorized to access the network; and
   in response to the client device being determined to have been authorized to access the network, generating the secure boot storage certificate.

3. The system of claim 1, wherein the generating of the secure boot storage certificate comprises:
   signing the secure boot storage certificate with the key exchange key that has been stored in the network boot data store.

4. The system of claim 3, wherein the secure boot data store of the client device and the network boot data store of the network switch correspond to respective unified extensible firmware interface based boot services.

5. The system of claim 1, wherein the sending of the secure boot storage certificate to the client device comprises:
   sending the secure boot storage certificate to the client device to facilitate the storage of the secure boot storage certificate in the secure boot data store of the client device utilizing a basic input output system based boot storage space modification procedure.

6. The system of claim 1, wherein the intercepting of the dynamic host configuration protocol discover packet comprises:
   in response to the detecting, via the network switch device, that the dynamic host configuration protocol discover packet has been received from the client device,
   extracting, from the dynamic host configuration protocol discover packet, a media access control address representing a distinct representation of the client device, and
   based on the media access control address, sending, to the client device, a request for the client device to send, to the system, the secure boot storage certificate that has been stored in the secure boot data store of the client device.

7. The system of claim 6, wherein the detecting that the dynamic host configuration protocol discover packet has been received comprises:
   preventing, via the network switch device, a dynamic host configuration protocol offer packet that has been transmitted from the dynamic host configuration protocol device from being forwarded to the client device pending a determination of whether the secure boot storage certificate that has been stored in the secure boot data store of the client device has been signed by the key exchange key that has been stored in the network boot data store.

8. The system of claim 7, wherein the determination of whether the secure boot storage certificate been signed by the key exchange key comprises:
   in response to the secure boot storage certificate being determined to have been signed by the key exchange key that has been stored in the network boot data store, forwarding the dynamic host configuration protocol offer packet to the client device to facilitate the assigning of the internet protocol address to the client device; and in response to the secure boot storage certificate being determined to have not been signed by the key exchange key that has been stored in the network boot data store, preventing the dynamic host configuration protocol offer packet from being forwarded to the client device to prevent an access of the respective accesses of the network by the client device.

9. A method, comprising:
in response to a device being determined to be authorized to access a network, facilitating, by a system comprising at least one processor, sending an authentication key to the device to result in storage of the authentication key in a device boot storage space of the device, wherein the authentication key has been signed by a key exchange key that has been stored in a switch boot storage space of a network switch of the network;
in response to a dynamic host configuration protocol discover packet being determined, via the network switch, to have been received from the device, determining, by the system, whether the device boot storage space comprises the authentication key that has been signed by the key exchange key that has been stored in the switch boot storage space; and
in response to the device boot storage space being determined to comprise the authentication key that has been signed by the key exchange key that has been stored in the switch boot storage space, facilitating, by the system, an assignment of an internet protocol address to the device to facilitate an access of the network by the device.

10. The method of claim 9, wherein the facilitating of the sending of the authentication key comprises:
generating the authentication key comprising signing the authentication key with the key exchange key that has been stored in the switch boot storage space.

11. The method of claim 9, further comprising:
in response to the dynamic host configuration protocol discover packet being determined, via the network switch, to have been received from the device, blocking, by the system via the network switch, a dynamic host configuration protocol offer packet that has been transmitted from a dynamic host configuration protocol device of the system from being sent to the device awaiting the device being determined to be authorized to access the network.

12. The method of claim 11, wherein the determining whether the device boot storage space comprises the authentication key comprises:
extracting, from the dynamic host configuration protocol discover packet, a media access control address representing the device; and
based on the media access control address, facilitating sending, to the device, a request for the device to send the authentication key to the system.

13. The method of claim 12, further comprising:
in response to the authentication key being determined to have not been received from the device, facilitating, by the system, sending, via the network switch, an internet protocol release notification to the dynamic host configuration protocol device to prevent the access of the network by the device.

14. The method of claim 12, further comprising:
in response to the authentication key being determined to have been received from the device, determining, by the system, whether the authentication key has been signed by the key exchange key that has been stored in the switch boot storage space.

15. The method of claim 14, wherein the facilitating of the sending of the authentication key comprises:
in response to the authentication key being determined to have been signed by the key exchange key that has been stored in the switch boot storage space, unblocking the dynamic host configuration protocol offer packet that has been transmitted from the dynamic host configuration protocol device to facilitate the assignment of the internet protocol address to the device.

16. The method of claim 14, further comprising:
in response to the authentication key being determined to have not been signed by the key exchange key that has been stored in the switch boot storage space, facilitating, by the system, sending, via the network switch, an internet protocol release notification to the dynamic host configuration protocol device to prevent the access of the network by the device.

17. A non-transitory machine-readable medium comprising instructions that, in response to execution, cause a system comprising at least one processor to perform operations, the operations comprising:
in response to determining that a client device has been authorized to access a network, sending a boot storage network access key to the client device to facilitate storage of the boot storage network access key in a memory partition of a device boot memory space of the client device, wherein the boot storage network access key has been signed by a key exchange key that has been stored in a network switch boot memory space of a network switch of the network;
in response to determining that a dynamic host configuration protocol discover packet has been received, via the network switch, from the client device, blocking a dynamic host configuration protocol offer packet that has been transmitted from a dynamic host configuration protocol device of the system from being forwarded to the client device pending the client device being determined to be authorized to access the network; and
in response to determining that the boot storage network access key, which has been stored in the memory partition in the device boot memory space, has been signed by the key exchange key that has been stored in the network switch boot memory space, authorizing the client device to access the network by unblocking the dynamic host configuration protocol offer packet, wherein the unblocking comprises forwarding the dynamic host configuration protocol offer packet to the client device.

18. The non-transitory machine-readable medium of claim 17, wherein the sending of the boot storage network access key to the client device comprises:
signing the boot storage network access key with the key exchange key that has been stored in the network switch boot memory space.

19. The non-transitory machine-readable medium of claim 17, wherein the device boot memory space of the client device and the network switch boot memory space of the network switch correspond to respective unified extensible firmware interface based boot services.

20. The non-transitory machine-readable medium of claim 17, wherein the determining that the dynamic host configuration protocol discover packet has been received from the client device comprises:

extracting, from the dynamic host configuration protocol discover packet, a media access control address representing the device; and based on the media access control address, sending, to the device, a request for the device to send the boot storage network access key to the system.

* * * * *